United States Patent
Ivashin et al.

(10) Patent No.: US 8,342,696 B2
(45) Date of Patent: Jan. 1, 2013

(54) SYSTEM AND METHOD FOR DISPLAYING REMOTE CONTENT THROUGH MULTIPLE PROJECTORS

(75) Inventors: Victor Ivashin, Danville, CA (US); Steve Nelson, San Jose, CA (US); Sean Miceli, San Jose, CA (US)

(73) Assignee: Seiko Epson Corporation, Tokyo (JP)

(*) Notice: Subject to any disclaimer, the term of this patent is extended or adjusted under 35 U.S.C. 154(b) by 361 days.

(21) Appl. No.: 12/748,191

(22) Filed: Mar. 26, 2010

(65) Prior Publication Data

US 2011/0234896 A1    Sep. 29, 2011

(51) Int. Cl.
G03B 21/26 (2006.01)
G03B 21/14 (2006.01)
G06F 3/041 (2006.01)
H04N 5/44 (2011.01)
H04N 7/18 (2006.01)

(52) U.S. Cl. .............. 353/94; 353/30; 353/69; 353/121; 345/169; 345/178; 348/189; 348/745; 348/211.99; 348/734; 348/114

(58) Field of Classification Search ............... 353/94, 353/70, 30, 69, 121; 345/169, 178; 348/189, 348/254, 745, 211.99, 734, 114
See application file for complete search history.

(56) References Cited

U.S. PATENT DOCUMENTS

| | | | |
|---|---|---|---|
| 6,456,339 | B1 | 9/2002 | Surati et al. |
| 6,727,864 | B1 | 4/2004 | Johnson et al. |
| 7,038,727 | B2 | 5/2006 | Majumder et al. |
| 7,129,456 | B2 | 10/2006 | Ioka et al. |
| 2002/0012004 | A1 | 1/2002 | Deering |
| 2002/0041708 | A1 | 4/2002 | Pettitt |
| 2006/0007406 | A1 | 1/2006 | Adkins et al. |
| 2006/0280360 | A1 | 12/2006 | Holub |
| 2007/0027504 | A1 | 2/2007 | Barrett et al. |
| 2007/0091201 | A1 | 4/2007 | Sasaki |
| 2007/0091277 | A1 | 4/2007 | Damera-Venkata et al. |
| 2007/0171380 | A1 | 7/2007 | Wright et al. |
| 2007/0291184 | A1 | 12/2007 | Harville et al. |
| 2008/0100805 | A1* | 5/2008 | Majumder et al. ............... 353/30 |
| 2008/0143978 | A1 | 6/2008 | Damera-Venkata et al. |
| 2008/0259223 | A1 | 10/2008 | Read et al. |
| 2009/0027523 | A1 | 1/2009 | Chang et al. |
| 2011/0234920 | A1* | 9/2011 | Nelson .......................... 348/745 |

FOREIGN PATENT DOCUMENTS

| | | |
|---|---|---|
| JP | 2006-108988 | 4/2006 |
| JP | 2006-135381 | 5/2006 |

* cited by examiner

*Primary Examiner* — Georgia Y Epps
*Assistant Examiner* — Magda Cruz

(57) ABSTRACT

A multi projector imaging system is provided. The system includes a plurality of projectors and a computing device in communication with the plurality of projectors. The computing device includes a projector platform module providing output to the plurality of projectors such that the plurality of projectors display partially overlapping output as a cohesive display. The projector platform module includes a projection player module having media drawers for preparing frames of data that are drawn into a frame buffer for eventual display through the plurality of projectors. The projection platform also includes a remote desktop controller. The remote desktop controller manages remote computing devices communicating with the projector platform, wherein the remote desktop controller specifies a resolution and aspect ratio for image data provided by the remote computing devices, and wherein the provided image data is stored in the frame buffer. A method for displaying content through the multi-projector system is also included.

19 Claims, 4 Drawing Sheets

SYSTEM AND METHOD FOR DISPLAYING REMOTE CONTENT THROUGH MULTIPLE PROJECTORS

BACKGROUND

Video projector technology continues to advance pixel resolution and light output levels with ever more capable display solutions. Lower device costs have also expanded utilization of these products. These trends are further influenced by techniques developed to seamlessly combine multiple projectors to form even larger and brighter displays. Such multi-device displays can now be created with shape and dimension capabilities far greater than the capabilities of a single device or with less cost than comparable single projector solutions.

Projectors typically have a variety of inputs for receiving source content to display. Video standards have defined a growing number of connectors and signaling formats ranging from older analog Composite, Separate Video (S-Video), and DSUB-15 through digital visual interface (DVI), high definition multimedia interface (HDMI), and DisplayPort. Network connections, memory cards, portable storage devices, and other interfaces can provide digital media in a variety of formats and through various protocols. Some projectors may have internal storage capabilities that allow for presenting preprocessed document files, images, or other content preloaded into the device.

The range of signaling, input resolutions and aspect ratios makes matching source content to display output capabilities an ongoing challenge. Generally, when source content resolution equals a device's native pixel resolution, higher output quality is achieved. Content scaling, cropping, or positioning output on only a portion of the display's pixel area are common operations employed by display devices. With larger displays composed of many projectors, the ideal "native" resolution is less clear. Virtual resolutions formed by the combined devices, each with a respective native resolution, create displays that may easily surpass the pixel dimensions or aspect ratios of the most common source content formats.

In an example business conference room environment, laptops are often physically brought and connected to a projector with a video cable to display source content. Personal computers (PCs) may be dynamically disconnected and others cabled in turn as demonstration content shifts among presenting participants. Cable reshuffling distracts the presentation flow and cable connector incompatibilities among devices can hamper progress of the presentation. Some projectors aide this situation by providing multiple input ports and connection types which can allow cabling of several PCs at once and provide user switching among the differing source inputs when required. In another environment, a single presentation PC is connected to the projector and content is required to be preloaded into the presentation PC, or accessed via a network connection, for the presentation. This environment requires time to transfer files and suggests sharing of the content on a public device.

A direct physical PC video connection to a projector allows display of the host operating system desktop and applications as the source content. The PC video card configuration determines the signal resolution. Network capable projectors may even provide interfaces to view content on the network or provide a mechanism to stream content, like the PC desktop, to the projection device. In all cases, resolutions of each connected device desktop vary and often do not match the ideal resolution of the projector. Projectors employ a scaling method to fill the output screen which can also introduce unwanted artifacts. In a large scale display, such as with a display from a multi-projector system, content from a device is typically always scaled to fit the large scale display resolution or otherwise presented within a bounded region on the display surface. The connected source device is not aware of the large scale display resolution or the scaling performed by the projection system and consequently limitations are imposed on the eventual large scale display.

It is within this context that the embodiments arise.

SUMMARY

In an example embodiment, a multi projector imaging system is provided. The system includes a plurality of projectors and a computing device in communication with the plurality of projectors. The computing device includes a projector platform module providing output to the plurality of projectors such that the plurality of projectors display partially overlapping output as a cohesive display. The projector platform module includes a projection player module having media drawers for preparing frames of data that are drawn into a frame buffer for eventual display through the plurality of projectors. The projection platform also includes a remote desktop controller. The remote desktop controller manages remote computing devices communicating with the projector platform, wherein the remote desktop controller specifies a resolution and aspect ratio for image data provided by the remote computing devices, and wherein the provided image data is stored in the frame buffer.

In another example embodiment, a method for displaying content through a multi-projector system is provided. The method includes establishing a remote desktop connection with a computing device and the multi-projector system and requesting an image resolution and aspect ratio for data transmitted from the computing device. The transmitted data is stored in a portion of a frame buffer assigned to a projector of the multi-projector system. The transmitted data is displayed within a region of an image displayed through the multi-projector system, wherein the image displayed through the multi-projector system is a unified display in which output from multiple projectors partially overlaps.

These and other aspects and advantages of the claimed inventions will become apparent from the following detailed description, which taken in conjunction with the accompanying drawings, illustrates by way of example the principles of the inventions.

DETAILED DESCRIPTION

In the following description, numerous specific details are set forth in order to provide a thorough understanding of the exemplary embodiments. However, it will be apparent to one skilled in the art that the example embodiments might be practiced without some of these specific details. In other instances, process operations and implementation details have not been described in detail, if already well known.

The embodiments described herein provide a system that has the capability to create a unified display from a set of commodity projectors and incorporate remote desktop displays into the unified display. The system does not require personal computers (PCs) to be brought and physically shuffled or cabled within the conference room. This system further provides the capability to utilize the maximum resolution of a large scale display. The system enables the desktop, applications, and stored content on remote PCs to be displayed on and controlled via a projector platform configured to seamlessly blend the overlapping output from multiple video projectors to form a cohesive large scale display. The system further removes physical and signal limitations imposed by direct video connections by allowing for larger virtual desktop resolutions matched in size to the large scale display. In addition, multiple control and selection features for display of multiple simultaneous remote PCs are provided. The system enables a set of projects to be configured as a large screen display. Further, the system provides a connection to a number of remote PCs on local private or remote public networks for visualization and interaction with networked PC desktops and applications. The display associated with the remote and networked PCs have a potential pixel resolution near the dimensions of the unified configured display in one embodiment. Described below are the system and methods used by the projector platform for enabling views of a remote PCs' desktops on a unified seamless display constructed through output from a plurality of video projectors.

Figure 1:
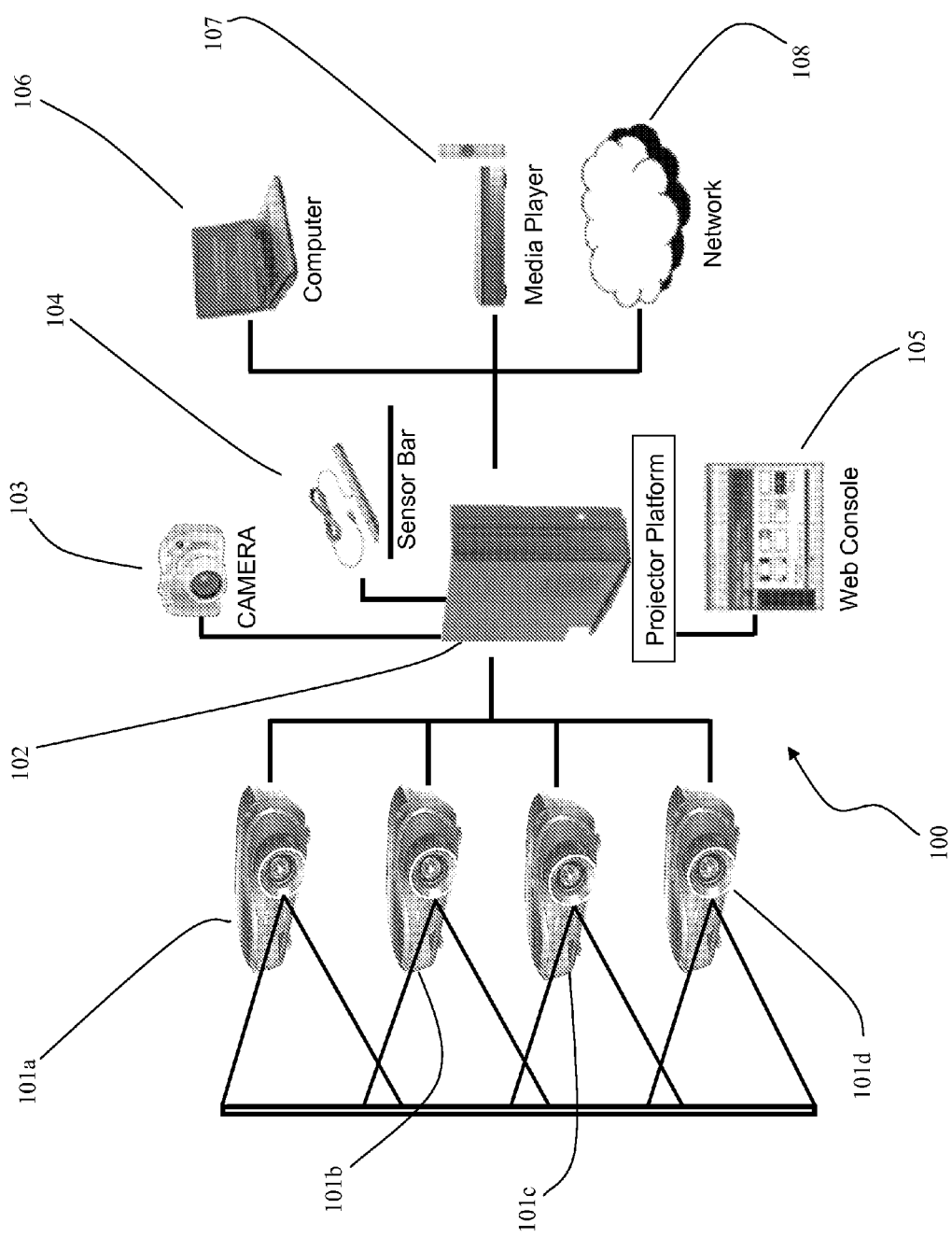
FIG. 1 is a schematic diagram of the hardware components for a system for creating a relatively seamless display from multiple projectors, in accordance with an example embodiment.

FIG. 1 is a schematic diagram of the hardware components for a system for creating a relatively seamless display from multiple projectors, in accordance with an example embodiment. In this embodiment, the system 100 includes a projector platform 102, which might be a general-purpose computer configured with a central processing unit (CPU) and a number of graphic processing units (GPUs), as well as memory, storage, and an operating system, such as a version of Linux® or Windows®. For example, the CPU might be an INTEL® Quad-Core Q6600 microprocessor and the GPUs might be two graphics cards which conform to the Peripheral Component Interconnect Express (PCIe) standard, such as the NVIDIA® GeForce 9800 GTX graphics cards. The two graphics cards allow the projector platform 102 to send video output for projection onto a surface to four video projectors, 101a, 101b, 101c, and 101d.

It will be appreciated that the example embodiments described herein might accommodate projection onto a flat surface or a surface that is irregular in terms of evenness. In an example embodiment, a digital still camera 103 (or a digital camera that is capable of taking a still photograph) is attached to projector platform 102 using USB (universal serial bus) cabling during calibration of the system 100. In an alternative example embodiment, a digital video camera might be used for calibration of the system 100. Following calibration, the digital camera 103 might be removed. An optional capture card allows for video input to the projector platform 102 from a laptop 106, from a media player 107, and/or from a network 108, which might be a LAN (local area network), a WAN (wide area network), the Internet, etc. An optional sensor bar 104 allows for non-video input to the project platform 102, as does the web console 105, which might receive input from a keyboard and/or a mouse.

Figure 2:
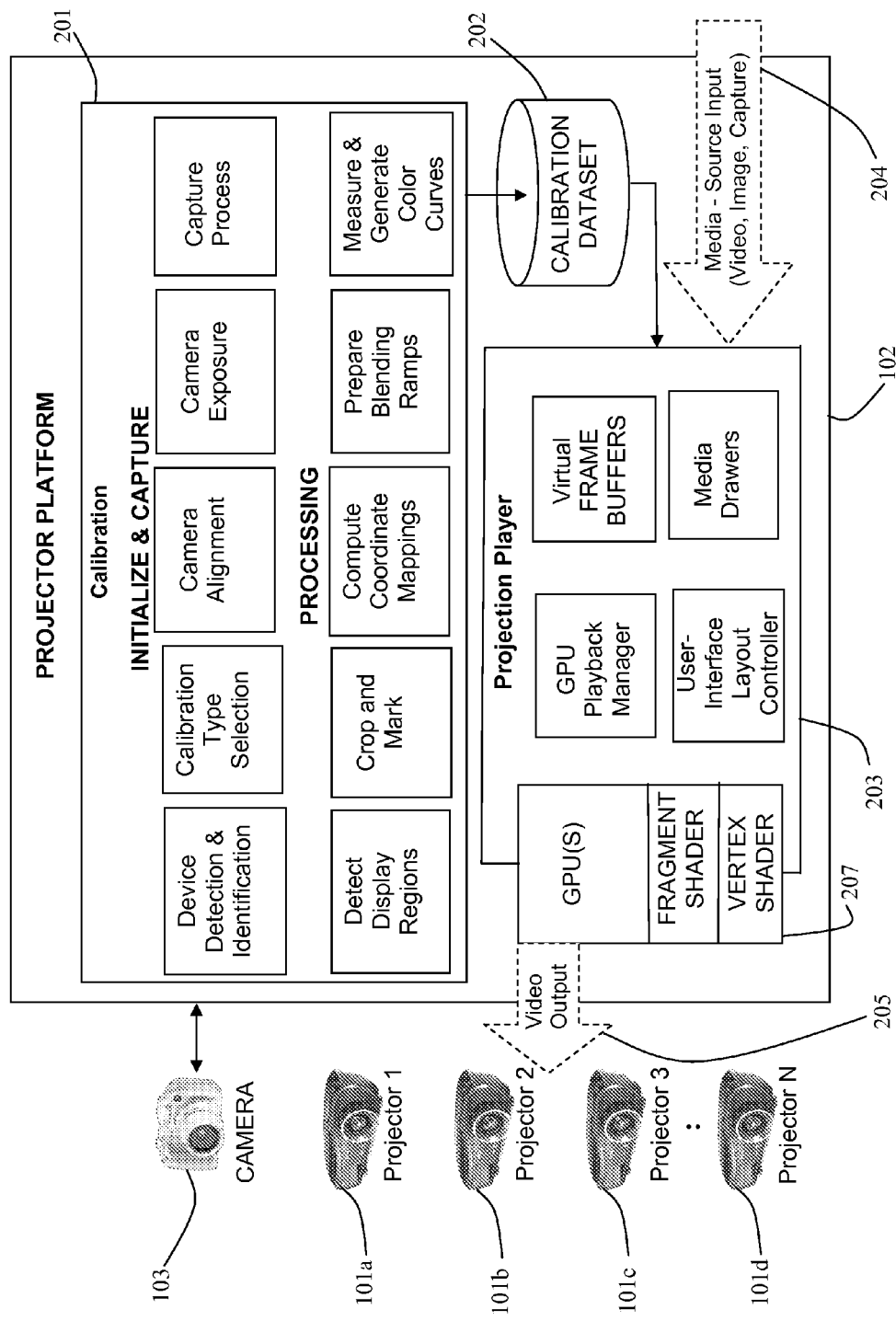
FIG. 2 is a schematic diagram of the high-level functional modules in a system for creating a relatively seamless display from multiple projectors, in accordance with an example embodiment.

FIG. 2 is a schematic diagram of the high-level functional modules in a system for creating a relatively seamless display from multiple projectors, in accordance with an example embodiment. In this embodiment, the projector platform 102 receives inputs 204 which are processed and subsequently output as video 205 to video projectors 101a, 101b, 101c, and 101d. As depicted in this figure, the inputs 204 might be video, images, or captures (e.g., captured with frame-grabber hardware or over a network). The digital camera 103 also provides input in the form of captured calibration images to the projector platform 102.

As depicted in FIG. 2, the projector platform 102 executes two high-level modules, which might be software, firmware, and/or hardware in example embodiments: a calibration module 201 and a projection player 203. The calibration module 201 interfaces with the projection player 203 through the calibration dataset 202, which persistently stores the output of the calibration module 201 for subsequent use by the projection player 203. The calibration module 201 includes two groups of modules. The first group of modules generally pertains to initialization and capture and includes modules for: (1) device detection and identification; (2) calibration type selection; (3) camera alignment; (4) camera exposure; and (5) capture process. The second group of modules generally pertains to processing and includes modules to: (1) detect display regions; (2) crop and mask; (3) compute coordinate mappings; (4) prepare blending ramps; and (5) measure and generate luminance (or color) adjustment curves. All results output by calibration module 201, including the luminance (or color) adjustment curves, are stored in the calibration dataset 202. These modules are described in greater detail in previously filed application Ser. Nos. 12/557,180 and 12/557,197, respectively, both of which are hereby incorporated by reference.

The projection player 203 takes as inputs the data stored in the calibration dataset 202 and the media 204. As depicted in FIG. 2, the projection player 203 includes the following modules: (1) a GPU playback manager; (2) virtual frame buffers; (3) a user-interface layout controller; and (4) media drawers. The projection player 203 interfaces with the system's GPUs, which execute a fragment shader and a vertex shader, in order to generate the adjusted video output 205 transmitted to the projectors 101a-101d for display on a surface. The fragment shader is the module in which the luminance (or color) adjustment curves are applied to pixels in source images, in an example embodiment described below.

It will be appreciated that at this point in the system, the media drawers have derived the source image from input 204, generated content, and virtual frame buffers, according to geometric conversions determined by the projection environment. Further geometric operations might be performed by the vertex shader (e.g., mappings) or by initial processes in the fragment shader. Consequently, the source image already incorporates the geometry of the image to be projected when the source image reaches the later processes of the fragment shader 207, where the luminance adjustment curves are applied.

Figure 3:
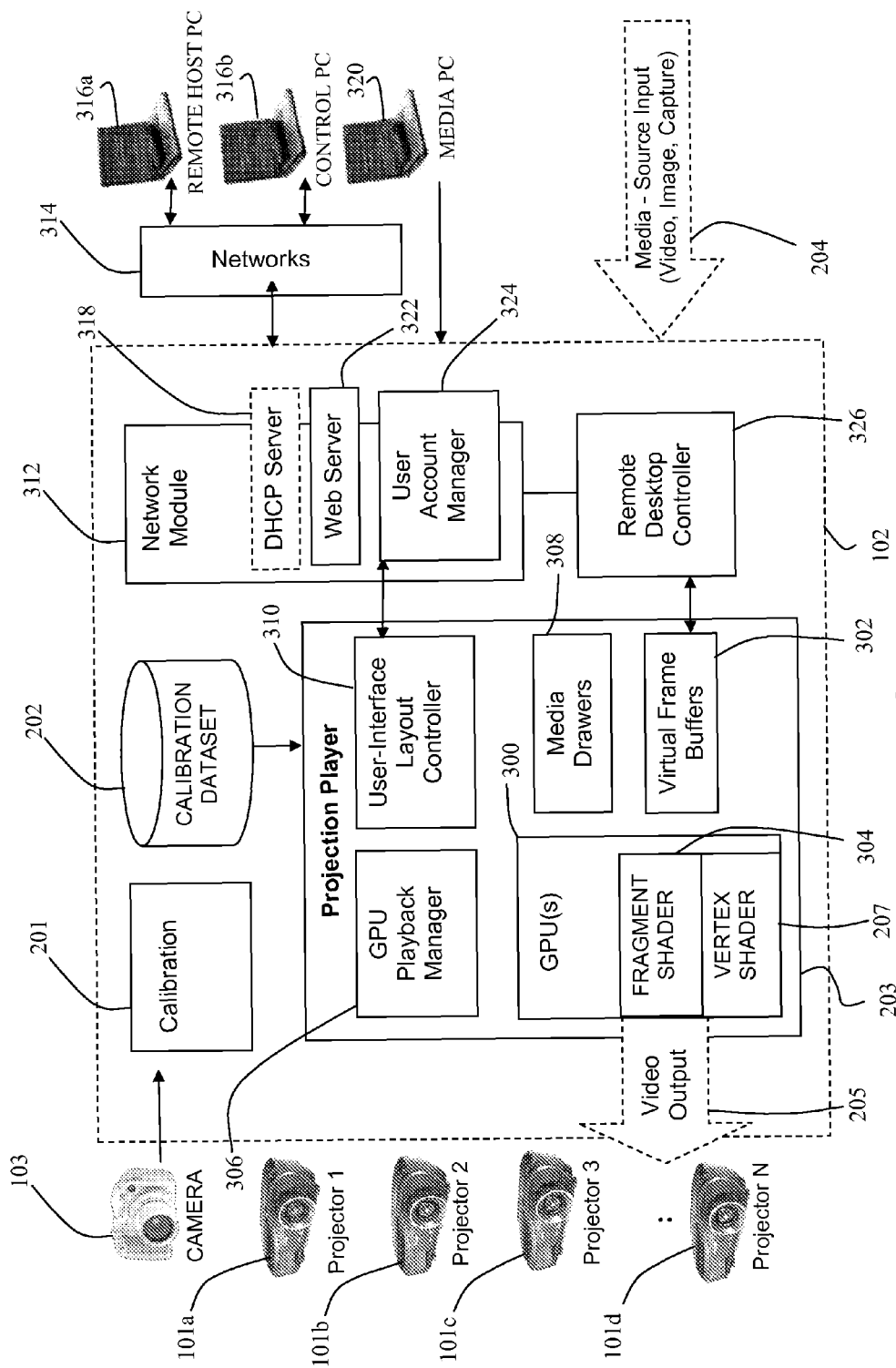
FIG. 3 is a simplified schematic diagram of a system for controlling and displaying remote computer content through multiple projectors in accordance with one embodiment of the invention.

FIG. 3 is a simplified schematic diagram of a system for controlling and displaying remote computer content through multiple projectors in accordance with one embodiment of the invention. The system of FIG. 3 and its associated components provide a unique input and control capability. Additionally, the mechanisms make use of increased performance provided by graphic processing units (GPUs) 300 and a pixel-shader language. Calibration module 201 represents a process that examines the output of one or more individual projectors 101a-101d and their relationship to one another. This information is processed to compute necessary adjustments for output pixels to best create a seamless unified display. The calibration process determines a maximum display region among the set of projectors. Virtual pixels make up the coordinate system of the unified display. Calibration module 201 accounts for mapping alignment and color blending measurements which can be associated with each device pixel. Individual device pixels in each projector's output projection are a potential contribution source to each virtual pixel of the unified display. Thus, the output of each video projector 101a-101d is examined carefully so that every device pixel can be identified and properly controlled to build the pixels of the unified display.

The physical size of the resulting unified display is determined by the count of projectors and the surface area occupied by the union of all projections in one embodiment. Projector pixel resolution determines the potential for unified display resolution. However, the resolution of the calibration captured camera frames determines the precision of pixel examination. Therefore, a camera frame defines the base virtual pixel coordinate system of a maximum unified display area. This camera coordinate system is used throughout the calibration process. The calibration process attempts to compute the mappings between projector device pixels and camera frame pixels. It should be appreciated that camera frame pixels can be scaled to a device pixel, if necessary however, precision error is propagated accordingly.

The result of the calibration process is calibration dataset 202. Calibration dataset 202 contains all information that will be used by player module 102 to enable real-time pixel-level control over the data output by each video projector 101a-101d. The resulting pixel-adjusted output 205 produces a unified display surface across the set of all video projectors 101a-101d and corrections are made in many areas including individual projector registration, color matching, blending, black point, correlation, display surface geometry, etc. Projection playback employs a calibration dataset prepared by the projector platform's calibration module 201, access to high-performance GPUs 300, and media content for display.

For each projector display, projection player 203 creates a virtual screen frame buffer 302 at the size computed for the bounded uniform display screen. Additionally, view projection matrix and color blending elements are loaded as appropriate from the calibration dataset contents associated with each given projector. Portions of calibration data 202 are converted and stored into texture elements provided to GPUs 300 for input to custom fragment-shader 304 and vertex-shader 207 modules (also loaded and compiled by the projection player). In one embodiment, OpenGL and the OpenGL Shading Language (GLSL) are used to define the fragment modules used by the player.

For each display frame time, GPU Playback Manager 306 manages the drawing interface between media drawers 308 and the GPU 300. GPU Playback Manager 306 provides the initialization interface to compile and load various shaders, texture elements, and memory mapped performance buffers. The main frame drawing pump to pass variables to the shaders for processing is managed by this module.

The projection player module 203 offers a set of user-interface controls to adjust various settings including the layout of media drawers 308 within the system through User-Interface Layout Controller 310. Configuration options and media selections are stored and loaded via configuration scripts and playlists. For different types of media input sources, media drawer module 308 is constructed for loading and advancing the specific media data content. In one embodiment, media drawers 308 include a movie content drawer, an image file drawer, a capture card drawer, and various test pattern drawers. It should be appreciated that the test pattern draws may be utilized for the calibration process. The role of media drawer 308 is to prepare frames of appropriate data for use by each projector instance during a frame advance/refresh process in accordance with one embodiment. This data is drawn into virtual frame buffers 302 which are then forwarded to GPU 300 for final device rendering. A single large frame buffer holds the main display elements in one embodiment. Portions of this buffer are copied to projector specific instances prior to rendering of each projector display by the GPU.

Media for playback may come from a variety of sources. Video, images, documents, or other computer generated content may arrive via a network or stored and retrieved on the projection platform's local storage. As with conventional video projector devices, video inputs or similar hardware interfaces are made available via capture hardware or a similar interface. In one embodiment, source content includes a remote desktop frame buffer. This frame buffer is updated in real-time and contains the desktop image of a PC on a connected network The projector platform includes networking module 312 to manage LAN/WAN/WLAN connections to local private and/or public networks 314. Hardware for networking module 312 may include IEEE 802.3 Ethernet devices with RJ45 connectors for wired application, or may use IEEE 802.11 wireless or IEEE 802.16 WiMAX connections. In one embodiment, projector platform 102 is connected and assigned an IP address in a network. This provides an address for establishing a conduit between projector platform 102 and machines 316a and 316b within the network. In another embodiment, projector platform 102 provides a dynamic host configuration protocol (DHCP) server module 318 to manage the assignment of Internet Protocol (IP) addresses to PCs connecting to the network. A switch or hub device may extend the number of connections. In another embodiment, projector platform 102 maintains a network address on two separate networks. One network may be a private local network and the other a public network. For example, the first network may be an internal business network that provides projector platform 102 access to machines networked within an organization. The second network could be configured and managed by projector platform 102 for access to machines only locating within a conference room and connected "ad hoc" by a visiting presenter.

With IP assignment and/or domain name system (DNS) support, projector platform 102 can be accessed by machines on the network. By providing web server 322, the projector platform offers access control, management, configuration, and a host of other interfaces though common web browser products enabled on remote machines. The web server component can allow the creation of user accounts and may facilitate downloading of components aiding automation to content access methods.

User account manager 324 and web server 322 maintain IP addresses and associated names from connecting PCs for future remote connections. Thus, an incoming request to the web server can record the source IP address and use this information to "phone home" back to the calling PC when it is time to negotiate remote desktop sharing. Alternately, a user may assign the connection address manually.

Web server 322 can provide the status of the projector platform by working in conjunction with other system modules. Display state and layout control can be reflected in the page interfaces and can provide controls to adjust the projector platform functions. In this manner, web interface allows the projector platform 102 to be controlled by a remote user with access rights to said operations.

Similar to a standalone projector, projector platform 102 may include a hardware method for capturing video signals through a cable connection with a PC/laptop or media player. This video signal will be captured at the specified signal resolution if supported by the hardware capture interface module. The captured frame buffers will be available to projector platform 102 as a virtual frame buffer media source for appropriate layout within the virtual display scene. In one embodiment, the resolution of the captured frame buffer will not be the same as the display and will require scaling.

Unlike the typical projector input signal switching, projector platform 102 can present content from many source inputs at the same time. Media content is available in virtual frame buffers 302 for display by media drawers 308 according to a variety of layout options. Each layout specifies the position of media across the screen in a virtual display environment allowing X,Y display position, width and height specifications, and Z order layering. As a result, selected virtual frame buffers may be scaled, positioned, overlapped, rotated, or otherwise manipulated within a 3D space before presentation of the unified display surface.

Remote desktop controller 326 manages remote desktop clients connecting to hosting RDP servers on remote PCs 316a, 316b and 320. Virtual frame buffers 302 store the desktop image within projection player 203 for use by layout controller 310 and media drawer modules 308. By using a Remote Desktop Protocol (RDP), projector platform 102 can share and communicate with RDP enabled PCs 316a, 316b and 320 anywhere on the available network. One skilled in the art will appreciate that RDP is a technology that is an extension of the ITU-T T.128 application sharing protocol, typically served from TCP port 3389.

The unique remote desktop client in projector platform 102 couples the large scale uniform display dimensions or the layout specified remote desktop dimensions to the requested RDP session. The received desktop images are stored into virtual frame buffer 302 for display by projection player 203. This method instructs the remote PC to serve a desktop view equal to the requested resolution and aspect ratio, possibly as large as the entire display. With this method, the remote PC essentially "adapts" its output to the variable display dimensions without necessity for further scaling operations.

Remote desktop controller 326 provides control of the shared desktop by enabling mouse and keyboard communication by forwarding the projector platform's mouse and keyboard input to the remote PC per typical desktop sharing arrangements. One difference is that the projector platform may assign another PC on the network this function, effectively utilizing the other PC hardware as a surrogate handler of mouse and keyboard input. This may be accomplished through an additional software client installed on the other PC via web server 322 activities and user requests in one embodiment. Multiple remote desktop clients may be available at the same time, so the projector platform provides selection among the active remote desktop virtual buffers and mouse/keyboard control means.

Figure 4:
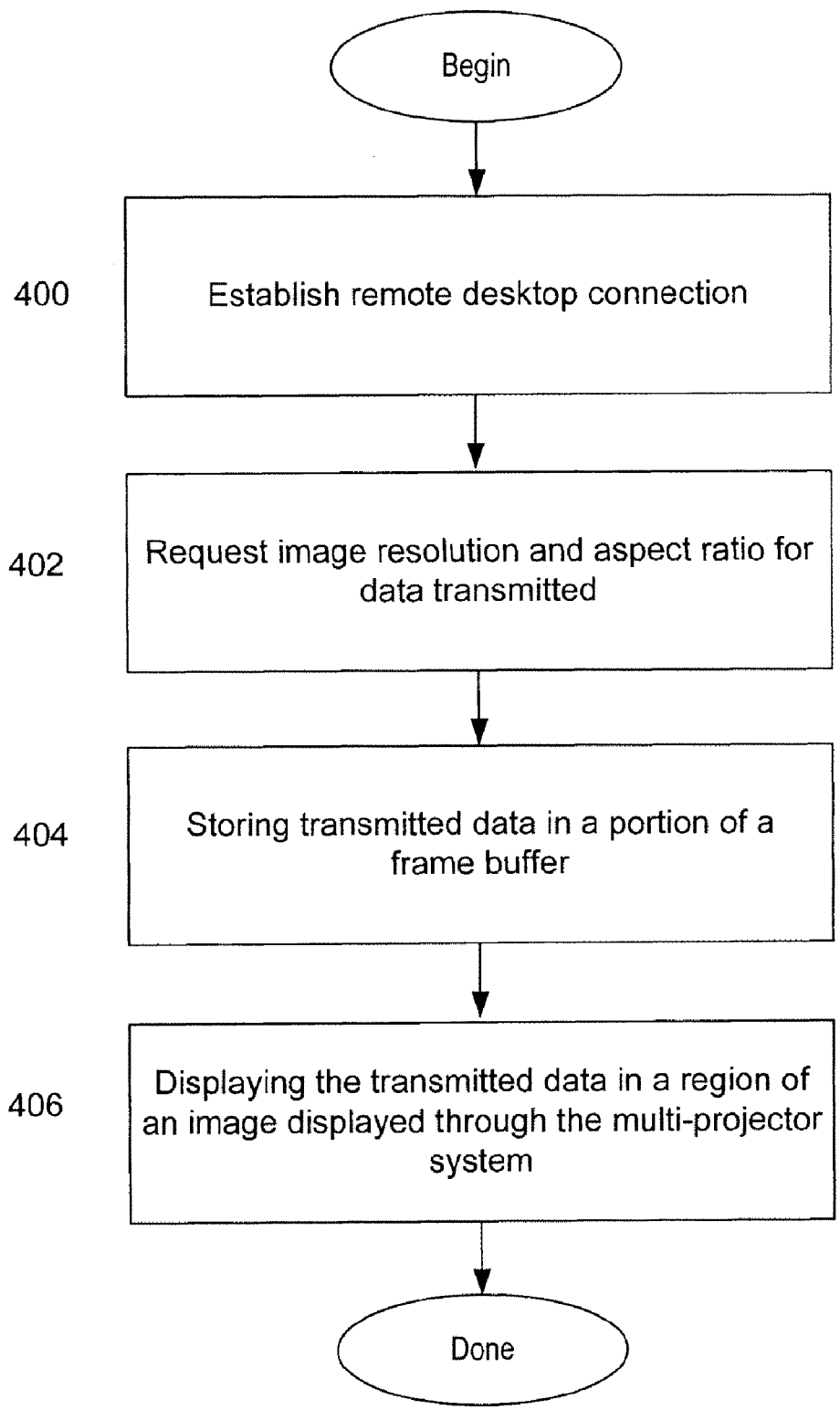
FIG. 4 is a flowchart diagram illustrating the method operations for displaying content through a multi-projector system in accordance with one embodiment of the invention.

FIG. 4 is a flowchart diagram illustrating the method operations for displaying content through a multi-projector system in accordance with one embodiment of the invention. The method initiates with operation 400 where a remote desktop connection is established. As mentioned above, the remote desktop controller of the projector platform may assist in managing the remote desktop connections. The method advances to operation 402 where an image resolution and aspect ratio for data transmitted from the remote computing device is requested by the remote desktop controller. The remote desktop controller has access to information concerning the large scale display dimensions for the multi-projector system or the layout specified remote desktop dimensions and can communicate this information for the RDP session. The method then advances to operation 404 where the transmitted data is stored in a portion of a frame buffer assigned to a projector of the multi-projector system. As mentioned above, the virtual frame buffer may include portions that are copied to projector specific instances. Thus, the transmitted data is stored in a portion of the virtual frame buffer assigned for a specific projector. The method then advances to operation 406 where the transmitted data is displayed within a region of an image displayed through the multi-projector system. The image displayed through the multi-projector system is a unified display in which output from multiple projectors partially overlaps as described above. As a result of the requesting operation it should be appreciated that remote PC essentially adapts the output to the variable display dimensions to avoid the need for further scaling operations in one embodiment.

In one embodiment, a user on the projector platform enables a GUI within the projector platform player. This interface provides input or selection to a remote PC by IP address, network device name, or similar name. The network manager locates the PC and establishes a remote desktop connection. The GUI within the projector platform allow for password input and similar exchanged information to create the remote desktop connection. The resolution chosen for the connection is configured to best utilize the virtual bounds region of the projector platform and according to the configured layout options. The desktop view of the remote PC appears within the specified region on the large scale display surface. Interaction with the keyboard and mouse, when enabled, allows for manipulation of the remote PC desktop as if the PC were cable connected to the large virtual display like a typical projector.

In another embodiment, a user invokes an internet browser in a PC and connects to the projector platform's web server. The interface pages allow a user to select a schedule for connection to the PC or to allow an immediate connection request. When triggered, the projector platform makes a remote desktop connection to the PC and begins display.

A PC connected to the projector platform web interface may utilize a control panel which can grant access to the mouse and keyboard controls normally provided by the projector platform to operate the remote PC. Alternately, the control of the layout and other projector platform player configuration and settings may be done through the web interfaces. In both examples, a remote PC may act as a meeting controller, configuring content and operating remote machines. A keyboard or mouse event may be enabled that relinquishes control of the remote PC for local operation.

This system described herein allows a group of participants attending a meeting in a conference room containing the large screen display while enabling the participants to remotely access office PCs. Presentations can be made by operating the PCs directly through the network. The size of the desktops can adapt to the display size and aspect ratio without additional scaling in one embodiment. This is useful when, in one embodiment, a dual projector display is calibrated and configured just before a meeting. The resolution and aspect ratio are determined according to the projector resolution and positions, i.e., relative to the overlap. In one case, the meeting will be to present a spreadsheet and thus a horizontal configuration is employed. This provides a wide display surface within which the shared remote desktop can show fully a wide format spreadsheet. In another case, the meeting content will be best served by a vertical configuration. The shared remote desktop takes on the dimensions, allowing full use of the display surface.

Any of the operations described herein that form part of the inventions are useful machine operations. The inventions also relate to a device or an apparatus for performing these operations. The apparatus may be specially constructed for that purpose or it may be a general-purpose computer selectively activated or configured by a computer program stored in the computer. In particular, various general-purpose machines may be used with computer programs written in accordance with the teachings herein or it may be more convenient to construct a more specialized apparatus to perform the operations.

The inventions can also be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network-coupled computer system so that the computer readable code is stored and executed in a distributed fashion.

It will be further appreciated that the instructions represented by the operations in the above figures are not required to be performed in the order illustrated and that all of the processing represented by the operations might not be necessary to practice the inventions. Further, the processes described in any of the above figures can also be implemented in software stored in any one of or combinations of the RAM, the ROM, or the hard disk drive.

Although the foregoing inventions have been described in some detail for purposes of clarity of understanding, it will be apparent that certain changes and modifications can be practiced within the scope of the appended claims. In this regard, it will be appreciated that there are many other possible orderings of the operations in the processes described above and many possible modularizations of those orderings in the system. Accordingly, the present embodiments are to be considered as illustrative and not restrictive, and the invention is not to be limited to the details given herein, but may be modified within the scope and equivalents of the appended claims. In the appended claims, elements and/or operations do not imply any particular order of operation, unless explicitly stated in the claims or implicitly required by the disclosure.

The invention claimed is:

1. A multi projector imaging system, comprising:
    a plurality of projectors;
    a projection control device controlling the plurality of projectors, the projection control device including a projector platform module providing video content to the plurality of projectors such that the plurality of projectors display partially overlapping output as a cohesive
    wherein the projector platform module includes:
        a projection player module having media drawers for preparing frames of data that are drawn into a frame buffer for eventual display through the plurality of projectors; and
        a remote desktop controller managing a plurality of remote personal computers (PCs) communicating with the projector platform module, wherein the remote PCs are remote from the projection control device and the plurality of projectors, the remote PCs have a shared desktop interface the remote desktop controller controls a remote PC's shared desktop, the remote desktop controller specifies a resolution and aspect ratio for image data provided by the remote PCs, and the provided image data is stored in the frame buffer.

2. The system of claim 1, wherein:
    the provided image data from the remote PCs is received by the projector platform module with the specified resolution and the aspect ratio;
    the projector platform module is responsive to keyboard and mouse inputs of the projection control device; and
    the remote desktop controller controls the remote PCs by forwarding the projector platform module's mouse and keyboard inputs to the remote PCs.

3. The system of claim 1, wherein the projector platform module includes:
    a network module to manage network connections, and a calibration module that manipulates the output from each of the plurality of projectors according to a calibration dataset stored in the projection control device, said calibration dataset including calibration data obtained from the simultaneous calibrating of multiple of said projectors by a single camera.

4. The system of claim 3, wherein the network module includes a dynamic host configuration protocol (DHCP) server for assigning a unique IP address to remote PCs in communication with the projection control device over a network.

5. The system of claim 3, wherein the network module includes a web server enabling control of the projector platform module by a user located remotely from the projection control device.

6. The system of claim 3, wherein the calibration dataset is generated through application and analysis of predefined test patterns displayed by the plurality of projectors, the test patterns stored in one of the media drawers.

7. The system of claim 1, wherein the projection player module includes a media drawer module having multiple instances, wherein each instance is configured to process different media content formats, the processed formats being stored in portions of the frame buffer, each portion being associated with one of the plurality of projectors.

8. The system of claim 1, wherein the remote PCs communicate with the projector platform module through a remote desktop protocol.

9. The system of claim 1, wherein each of said remote PCs provides separate and independent image data to the projection control device.

10. The system of claim 1, wherein the projection control device sends all image data from all remote PCs to the plurality of projectors for separate and simultaneous projection.

11. The system of claim 1, wherein the projection control device sends image data from a selected one of said plurality of remote PCs to the plurality of projectors creation of one composite image spanning the projection area of said plurality of projectors.

12. A method for displaying content through a multi-projector system, comprising:
    using the multi-projector system to establish a remote desktop connection with a remote personal computer (PC);
    using the multi-projector system to define an image resolution and aspect ratio for data transmitted from the remote PC;
    storing the transmitted data in a portion of a frame buffer assigned to a projector of the multi-projector system; and displaying the transmitted data within a region of an image displayed through the multi-projector system, wherein the image displayed through the multi-projector system is a unified display in which output from multiple projectors partially overlaps.

13. The method of claim 12, wherein storing the transmitted data in a portion of a frame buffer assigned to a projector of the multi-projector system includes processing the transmitted data according to a format type.

14. The method of claim 12, wherein the transmitted data is displayed at the requested image resolution and aspect ratio.

15. The method of claim 12, further comprising:
scaling the transmitted data prior to displaying.

16. The method of claim 12, wherein multiple remote desktop connections are established in the remote PCs and wherein corresponding desktop images for the multiple connections are displayed in the unified display.

17. The method of claim 16, wherein a remote PC associated with one of the multiple remote desktop connections controls another remote PC having a different one of the multiple remote desktop connections.

18. The method of claim 12, wherein the displaying includes, modifying the transmitted data according to a calibration dataset that maps between projector device pixels and a previously captured calibration image displayed by projectors of the multi-projector system.

19. The method of claim 12, wherein each method operation is embodied as program instructions on a computer readable storage medium.

* * * * *